United States Patent
Feng et al.

(10) Patent No.: US 12,129,026 B2
(45) Date of Patent: Oct. 29, 2024

(54) METHOD AND SYSTEM FOR CONTROLLING AIRCRAFT

(71) Applicant: AUTEL ROBOTICS CO., LTD., Guangdong (CN)

(72) Inventors: Yinhua Feng, Guangdong (CN); Hongliang Yu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 544 days.

(21) Appl. No.: 17/370,617

(22) Filed: Jul. 8, 2021

(65) Prior Publication Data

US 2021/0333807 A1    Oct. 28, 2021

Related U.S. Application Data

(63) Continuation of application No. PCT/CN2020/070958, filed on Jan. 8, 2020.

(30) Foreign Application Priority Data

Jan. 8, 2019    (CN) .................... 201910014850.X

(51) Int. Cl.
*B64C 39/02*    (2023.01)
*G05D 1/00*    (2006.01)
(Continued)

(52) U.S. Cl.
CPC ......... *B64C 39/024* (2013.01); *G05D 1/0022* (2013.01); *G05D 1/101* (2013.01);
(Continued)

(58) Field of Classification Search
None
See application file for complete search history.

(56) References Cited

U.S. PATENT DOCUMENTS

2009/0316755 A1    12/2009    Collette et al.
2015/0230207 A1*   8/2015    Wang .................... H04N 7/185
                                                              370/329
(Continued)

FOREIGN PATENT DOCUMENTS

CN    105336151 A    2/2016
CN    105828049 A    8/2016
(Continued)

OTHER PUBLICATIONS

Hu, Machine Translation of WO2018177270, Oct. 2018, espacenet.com (Year: 2018).*

(Continued)

*Primary Examiner* — David P. Merlino
(74) *Attorney, Agent, or Firm* — Frank Gao, Esq.

(57) ABSTRACT

Embodiments of the present invention relate to the technical field of aircrafts and provide an aircraft control method and a flight control system. The method is applicable to an aircraft and includes: connecting a remote control to a master terminal; connecting the master terminal to at least one slave terminal, so that each of the at least one slave terminal is connected to the master terminal; determining that the remote control has been connected to the aircraft; and controlling, by the remote control, the aircraft according to control instructions transmitted by the master terminal and/or the at least one slave terminal. By means of the method, providing each terminal with a remote control can be avoided, thereby reducing the burden of holding remote controls and reducing costs.

18 Claims, 5 Drawing Sheets

(51) Int. Cl.
 *H04W 4/40* (2018.01)
 *H04W 4/80* (2018.01)
 *H04W 76/11* (2018.01)

(52) U.S. Cl.
 CPC .............. *H04W 4/40* (2018.02); *H04W 4/80* (2018.02); *H04W 76/11* (2018.02); *B64U 2201/20* (2023.01)

(56) References Cited

U.S. PATENT DOCUMENTS

| | | | |
|---|---|---|---|
| 2020/0026273 A1* | 1/2020 | He | G08C 17/02 |
| 2020/0264604 A1* | 8/2020 | Tao | H04W 12/03 |
| 2021/0153153 A1* | 5/2021 | Yang | H04W 76/40 |
| 2021/0176731 A1* | 6/2021 | Yang | H04W 72/0453 |

FOREIGN PATENT DOCUMENTS

| | | | |
|---|---|---|---|
| CN | 105830129 A | 8/2016 | |
| CN | 107438801 A | 12/2017 | |
| CN | 107526364 A | 12/2017 | |
| CN | 109445464 A | 3/2019 | |
| WO | WO-2018177270 A1 * | 10/2018 | ........... G05D 1/0022 |

OTHER PUBLICATIONS

Zheng, Machine Translation of CN107526364, Dec. 2017, espacenet.com (Year: 2017).*
Guan, Machine Translation of CN105830129, Aug. 2016, espacenet.com (Year: 2016).*
The International Search Report mailed Mar. 30, 2020; PCT/CN2020/070958.

* cited by examiner

METHOD AND SYSTEM FOR CONTROLLING AIRCRAFT

CROSS REFERENCE

This application is a continuation of International Application No. PCT/CN2020/070958, filed on Jan. 8, 2020, which claims priority to Chinese Patent Application No. 201910014850X filed on Jan. 8, 2019, which is incorporated herein by reference in its entirety.

BACKGROUND

Technical Field

Embodiments of the present invention relate to the technical field of aircrafts, and in particular, to a method and system for controlling aircraft.

Related Art

In recent years, as a new type of vehicle, an aircraft such as an unmanned aerial vehicle (UAV for short) is applicable to various fields, such as aerial photography, agriculture, plant protection, mini-selfie, express transportation, disaster relief and the like.

In actual application of the aircraft, various control methods can be used to control the aircraft to enable the aircraft to complete designated tasks, for example, a flight task, a photographing task and so on. At present, the aircraft is usually controlled through a terminal device. The terminal device may be a remote control, a mobile phone terminal, a personal computer (PC) terminal, a wearable device and the like. The control of the terminal device may include a single terminal device controlling the aircraft or a plurality of terminal devices simultaneously controlling the aircraft. A plurality of devices are used to control the aircraft simultaneously to implement master-slave control of the aircraft. The master-slave control method may be usually applicable to a case of novice teaching of the aircraft and an instructor guiding students to operate the aircraft.

For the current master-slave control, the UAV is given by way of example. A UAV is usually equipped with a plurality of remote controls. Each of the remote controls is equipped with a mobile phone terminal device. Through each of the mobile phone terminals, such as a master terminal or a slave terminal, control instructions are transmitted to the corresponding remote control to implement the master-slave control of the UAV.

During implementing the present invention, the inventor finds that there are at least the following problems in the related art. At present, for the master-slave control of the aircrafts such as the UAV, the master terminal or the slave terminal needs to be equipped with a corresponding remote control. One remote control can receive only the control instructions transmitted by a mobile phone terminal device. A plurality of remote controls are used to respectively transmit, to the aircraft, the received control instruction transmitted by the corresponding mobile phone terminal device to implement the control of the aircraft. On the one hand, the method requires each mobile terminal device to be equipped with a remote control, and a user of each mobile terminal device needs to carry a remote control, which increases the burden on the user to hold the remote control. On the other hand, a plurality of remote controls are required to implement the master-slave control of the aircraft, resulting in an increase in costs.

SUMMARY

Embodiments of the present application provide an aircraft control method and a flight control system, which can avoid providing each terminal with a remote control, thereby reducing the burden of holding remote controls and reducing costs.

In the embodiments of the present invention, the following technical solutions are disclosed:

In a first aspect, an embodiment of the present invention provides a method for controlling aircraft, applicable to an aircraft, the method including:
  connecting a remote control to a master terminal;
  connecting the master terminal to at least one slave terminal, so that each of the at least one slave terminal is connected to the master terminal;
  determining that the remote control has been connected to the aircraft; and
  controlling, by the remote control, the aircraft according to control instructions transmitted by the master terminal and/or the at least one slave terminal.

Optionally, the remote control is connected to the master terminal through a wired connection or a wireless connection.

Optionally, the remote control is connected to the master terminal through the wired connection, the wired connection including a universal serial bus (USB) connection.

Optionally, the master terminal is connected to the at least one slave terminal through a wireless connection.

Optionally, the wireless connection includes at least one of a Wi-Fi connection and a Bluetooth connection.

Optionally, the controlling, by the remote control, the aircraft according to control instructions transmitted by the master terminal and/or the at least one slave terminal includes:
  controlling, by the remote control, the aircraft according to control instructions that are transmitted by the master terminal and/or the at least one slave terminal according to a preset control instruction transmission rule, the preset control instruction transmission rule being determined by identification information carried by each of the control instructions.

Optionally, the identification information includes at least one of the following identifiers:
  a time identifier, a source identifier and a function identifier,
  the time identifier being used for identifying a time at which the control instruction is transmitted, the source identifier being used for identifying the control instruction as being transmitted by the master terminal or being transmitted by a slave terminal, and the function identifier being used for identifying a function implemented by the control instruction.

Optionally, the identification information includes at least two of the time identifier, the source identifier and the function identifier, and the controlling, by the remote control, the aircraft according to control instructions transmitted by the master terminal and/or the at least one slave terminal includes:
  determining, by the remote control, priorities of the identifiers in the identification information; and
  transmitting, by the remote control to the aircraft according to the priorities, the control instructions transmitted by the master terminal and/or the at least one slave terminal, to control the aircraft.

Optionally, the identification information includes the source identifier, and the controlling, by the remote control, the aircraft according to control instructions that are transmitted by the master terminal and/or the at least one slave terminal according to a preset control instruction transmission rule includes:

detecting, according to the source identifiers, whether a control instruction transmitted by the master terminal is present in the control instructions; and if so, controlling, by the remote control, the aircraft according to the control instruction transmitted by the master terminal.

Optionally, the identification information includes the time identifier, and the controlling, by the remote control, the aircraft according to control instructions that are transmitted by the master terminal and/or the at least one slave terminal according to a preset control instruction transmission rule includes:

controlling, by the remote control, the aircraft according to a chronological order in which the control instructions are received, the chronological order in which the control instructions are received being determined by the time identifiers.

Optionally, the identification information includes the source identifier, and the transmitting, by the remote control to the aircraft according to the priorities, the control instructions transmitted by the master terminal and/or the at least one slave terminal, to control the aircraft includes:

determining that the control instructions are transmitted by the at least one slave terminal when it is detected, according to the source identifiers, that a control instruction transmitted by the master terminal is not present in the control instructions;

detecting whether the identification information of the control instructions include the time identifiers; and transmitting, by the remote control, all of the control instructions sequentially to the aircraft according to a chronological order in which the control instructions are received, to control the aircraft, if the identification information includes the time identifiers, the chronological order in which the control instructions are received being determined by the time identifiers.

Optionally, the identification information includes the source identifier, and the transmitting, by the remote control to the aircraft according to the priorities, the control instructions transmitted by the master terminal and/or the at least one slave terminal, to control the aircraft includes:

detecting whether the identification information of a control instruction transmitted by the master terminal and control instructions transmitted by the at least one slave terminal includes the function identifiers, when it is detected, according to the source identifiers, that the control instruction transmitted by the master terminal and the control instructions transmitted by the at least one slave terminal are present in the control instructions;

detecting, according to the function identifiers, whether a control instruction that implements a function the same as a function implemented by the control instruction transmitted by the master terminal is present in the control instructions transmitted by the at least one slave terminal, if the identification information includes the function identifiers; and transmitting, to the aircraft, the control instruction transmitted by the master terminal and ones of the control instructions transmitted by the at least one slave terminal that implement functions different from the function implemented by the control instruction transmitted by the master terminal, to control the aircraft, when it is detected that the control instruction that implements the function the same as the function implemented by the control instruction transmitted by the master terminal is present.

Optionally, the transmitting, by the remote control to the aircraft, the control instruction transmitted by the master terminal and ones of the control instructions transmitted by the at least one slave terminal that implement functions different from the function implemented by the control instruction transmitted by the master terminal includes:

transmitting the control instruction transmitted by the master terminal to the aircraft;

detecting whether the identification information of the ones of the control instructions transmitted by the at least one slave terminal that implement the functions different from the function implemented by the control instruction transmitted by the master terminal includes the time identifiers; and sequentially transmitting, by the remote control, all of the ones of the control instructions transmitted by the at least one slave terminal that implement the functions different from the function implemented by the control instruction transmitted by the master terminal to the aircraft according to a chronological order in which the control instructions are received, if the identification information includes the time identifiers, the chronological order in which the ones of the control instructions transmitted by the at least one slave terminal that implement the functions different from the function implemented by the control instruction transmitted by the master terminal are received being determined by the time identifiers carried by the control instructions.

In a second aspect, an embodiment of the present invention provides a system for controlling aircraft, configured to control an aircraft and including a remote control, a master terminal and at least one slave terminal, the remote control being connected to the master terminal, the master terminal being connected to the at least one slave terminal, so that each of the at least one slave terminal is connected to the master terminal, and the remote control being connected to the aircraft;

the remote control including:

at least one processor; and a memory communicatively connected to the at least one processor, where the memory stores instructions executable by the at least one processor, and the instructions are executed by the at least one processor to cause the at least one processor to:

control the aircraft according to control instructions transmitted by the master terminal and/or the at least one slave terminal.

Optionally, the remote control is connected to the master terminal through a wired connection or a wireless connection.

Optionally, the remote control is connected to the master terminal through the wired connection, the wired connection including a USB connection.

Optionally, the master terminal is connected to the at least one slave terminal through a wireless connection.

Optionally, the wireless connection includes at least one of a Wi-Fi connection and a Bluetooth connection.

Optionally, the controlling, by the at least one processor, the aircraft according to control instructions transmitted by the master terminal and/or the at least one slave terminal includes:

controlling, by the remote control, the aircraft according to control instructions that are transmitted by the master terminal and/or the at least one slave terminal according to a preset control instruction transmission rule, the preset control instruction transmission rule being determined by identification information carried by each of the control instructions.

Optionally, the identification information includes at least one of the following identifiers:
a time identifier, a source identifier and a function identifier,
the time identifier being used for identifying a time at which the control instruction is transmitted, the source identifier being used for identifying the control instruction as being transmitted by the master terminal or being transmitted by a slave terminal, and the function identifier being used for identifying a function implemented by the control instruction.

Optionally, the identification information includes at least two of the time identifier, the source identifier and the function identifier, and the controlling, by the at least one processor, the aircraft according to control instructions transmitted by the master terminal and/or the at least one slave terminal includes:
determining priorities of the identifiers in the identification information; and
transmitting, to the aircraft according to the priorities, the control instructions transmitted by the master terminal and/or the at least one slave terminal, to control the aircraft.

Optionally, the identification information includes the source identifier, and the controlling, by the at least one processor, the aircraft according to control instructions that are transmitted by the master terminal and/or the at least one slave terminal according to a preset control instruction transmission rule includes:
detecting, according to the source identifiers, whether a control instruction transmitted by the master terminal is present in the control instructions; and
if so, controlling, by the remote control, the aircraft according to the control instruction transmitted by the master terminal.

Optionally, the identification information includes the time identifier, and the controlling, by the at least one processor, the aircraft according to control instructions that are transmitted by the master terminal and/or the at least one slave terminal according to a preset control instruction transmission rule includes:
controlling, by the remote control, the aircraft according to a chronological order in which the control instructions are received, the chronological order in which the control instructions are received being determined by the time identifiers.

Optionally, the identification information includes the source identifier, and the transmitting, by the at least one processor, to the aircraft according to the priorities, the control instructions transmitted by the master terminal and/or the at least one slave terminal, to control the aircraft includes:
determining that the control instructions are transmitted by the at least one slave terminal when it is detected, according to the source identifiers, that a control instruction transmitted by the master terminal is not present in the control instructions;
detecting whether the identification information of the control instructions include the time identifiers; and
transmitting, by the remote control, all of the control instructions sequentially to the aircraft according to a chronological order in which the control instructions are received, to control the aircraft, if the identification information includes the time identifiers,
the chronological order in which the control instructions are received being determined by the time identifiers.

Optionally, the identification information includes the source identifier, and the transmitting, by the at least one processor, to the aircraft according to the priorities, the control instructions transmitted by the master terminal and/or the at least one slave terminal, to control the aircraft includes:
detecting whether the identification information of a control instruction transmitted by the master terminal and control instructions transmitted by the at least one slave terminal includes the function identifiers, when it is detected, according to the source identifiers, that the control instruction transmitted by the master terminal and the control instructions transmitted by the at least one slave terminal are present in the control instructions;
detecting, according to the function identifiers, whether a control instruction that implements a function the same as a function implemented by the control instruction transmitted by the master terminal is present in the control instructions transmitted by the at least one slave terminal, if the identification information includes the function identifiers; and
transmitting, to the aircraft, the control instruction transmitted by the master terminal and ones of the control instructions transmitted by the at least one slave terminal that implement functions different from the function implemented by the control instruction transmitted by the master terminal, to control the aircraft, when it is detected that the control instruction that implements the function the same as the function implemented by the control instruction transmitted by the master terminal is present.

Optionally, the transmitting, by the at least one processor to the aircraft, the control instruction transmitted by the master terminal and ones of the control instructions transmitted by the at least one slave terminal that implement functions different from the function implemented by the control instruction transmitted by the master terminal includes:
transmitting the control instruction transmitted by the master terminal to the aircraft;
detecting whether the identification information of the ones of the control instructions transmitted by the at least one slave terminal that implement the functions different from the function implemented by the control instruction transmitted by the master terminal includes the time identifiers; and
sequentially transmitting, by the remote control, all of the ones of the control instructions transmitted by the at least one slave terminal that implement the functions different from the function implemented by the control instruction transmitted by the master terminal to the aircraft according to a chronological order in which the control instructions are received, if the identification information includes the time identifiers,
the chronological order in which the ones of the control instructions transmitted by the at least one slave terminal that implement the functions different from the function implemented by the control instruction transmitted by the master terminal are received being determined by the time identifiers carried by the control instructions.

In the embodiment of the present invention, the remote control is connected to the master terminal, and the master terminal is connected to the at least one slave terminal. The remote control can receive the control instruction transmitted by the master terminal and the control instructions transmitted by the at least one slave terminal, and transmit the received control instructions to the aircraft to control the aircraft, which can avoid providing each terminal with a remote control to control the aircraft, thereby reducing the burden of holding remote controls and reducing costs.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

The technical solutions in the embodiments of the present invention are described below in detail with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In addition, technical features involved in implementations of the present invention that are described below may be combined with each other provided that no conflict occurs.

Figure 1:
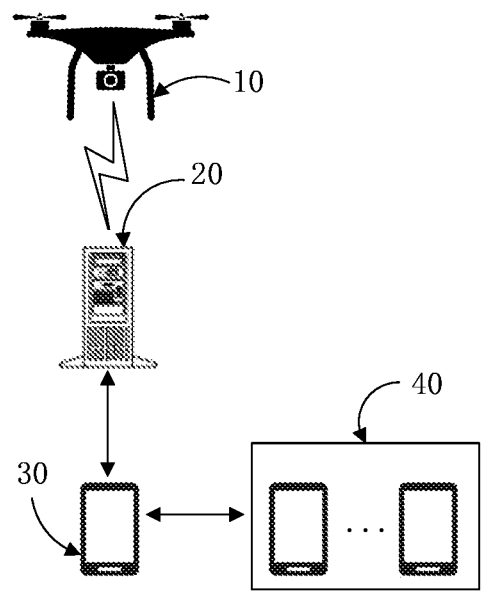
FIG. 1 is a schematic diagram of an application environment of an aircraft control method according to an embodiment of the present invention.

FIG. 1 is a schematic diagram of an application environment of an aircraft control method according to an embodiment of the present invention. The application environment includes an aircraft 10, a remote control 20, a master terminal 30 and at least one slave terminal 40.

The aircraft 10 is connected to the remote control 20, the master terminal 30 is connected to the remote control 20, and the at least one slave terminal 40 is connected to the master terminal 30, that is, each of the at least one slave terminal 40 is connected to the master terminal 30. Each of the above connections may be a communication connection, and the communication connection is used to implement interaction of data or information between various devices.

In some implementations, the remote control 20 may be connected to the aircraft 10 through a wired connection or a wireless connection, for example, communication is established through a wireless communication module, so as to implement the data interaction between the remote control 20 and the aircraft 10.

The remote control 20 may be connected to the master terminal 30 through a wired connection or a wireless connection. The wired connection may include a USB connection and the like, and the wireless connection may include a Wi-Fi connection, a Bluetooth connection, an infrared connection and the like. Compared with the Wi-Fi connection, the USB connection has certain advantages in reading data, that is, compared with the Wi-Fi connection, the USB connection reads data faster and has a larger bandwidth rate. Therefore, in the embodiment of the present invention, in order to read data faster, the remote control 20 is connected to the master terminal 30 via a USB.

The master terminal 30 may be connected to the at least one slave terminal 40 through a wireless connection. The wireless connection includes at least one of the Wi-Fi connection and the Bluetooth connection. For example, communication is established through the Wi-Fi module, and the master terminal 30 interacts with at least one slave terminal 40 in data.

In addition, a user holding the master terminal 30 or at least one slave terminal 40 can operate the corresponding terminal to control the aircraft 10. For example, in application in which an instructor takes students to operate the aircraft during teaching a novice of the aircraft, the instructor operates the master terminal 30 and a student operates at least one slave terminal 40 to implement master-slave control of the aircraft 10. The control of the aircraft 10 includes, but is not limited to, controlling the flight of the aircraft 10 or controlling the photographing of the aircraft 10.

As a kind of flying vehicle, the aircraft 10 is mainly used to complete designated tasks by flying, such as a flying task of flying to a designated location, a photographing task during the flight or the like. In the actual application of the aircraft 10, the aircraft 10 is usually equipped with a terminal device for controlling the aircraft 10. The terminal device includes but is not limited to: a remote control device, a mobile phone terminal, a personal computer (PC) terminal, a wearable device and the like. The control of the terminal device may include a single terminal device controlling the aircraft or a plurality of terminal devices simultaneously controlling the aircraft.

Figure 2:
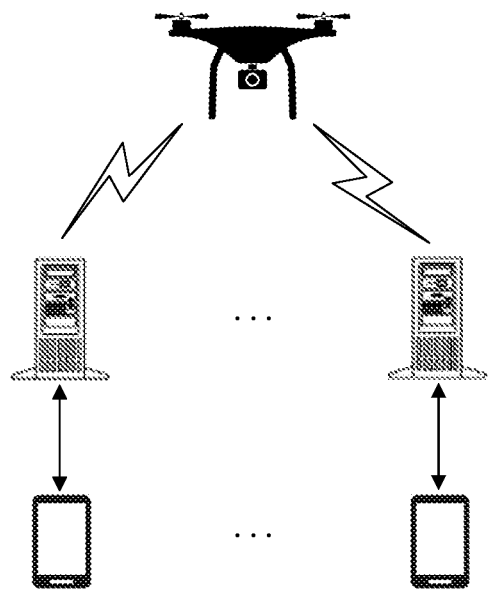
FIG. 2 is a schematic diagram of a current aircraft equipped with a plurality of remote controls, and each remote control being equipped with a mobile phone terminal device.

At present, in application in which a plurality of terminal devices simultaneously control the aircraft, such as teaching the novice for the aircraft, and in application in which the instructor takes the students to operate the aircraft, as shown in FIG. 2, an aircraft is usually equipped with a plurality of remote controls, each of the remote controls being equipped with one mobile phone terminal device. One aircraft simultaneously is paired with the plurality of remote controls to establish a connection, and each of the remote controls is connected to its corresponding mobile terminal. Control instructions are transmitted to the corresponding remote control through each mobile terminal such as the master terminal (a training machine) or the slave terminal (a student machine), to achieve master-slave control of the aircraft.

For the above control mode, the master terminal or the slave terminal needs to be equipped with a corresponding remote control. One remote control can receive only control instructions transmitted by a mobile phone terminal device. A plurality of remote controls are used to respectively transmit, to the aircraft, the received control instructions transmitted by the corresponding mobile phone terminal device to implement the control of the aircraft. On the one hand, the method requires each mobile terminal device to be equipped with a remote control, and a user of each mobile terminal device needs to carry a remote control, which increases the burden on the user to hold the remote control. On the other hand, a plurality of remote controls are required to implement the master-slave control of the aircraft, resulting in an increase in costs.

In addition, for the data transmitted by the aircraft, such as flight information of the aircraft and image information taken by the aircraft, if a mode in which one aircraft is equipped with a plurality of remote controls and each of the remote controls is equipped with one mobile terminal device is adopted, a bandwidth needs to be divided into several parts, and the data is transmitted to each of the remote controls under the limitation of the bandwidth. This not only affects the efficiency of data transmission, and interference exists between the transmission of data due to the broadband shunting, thus affecting stability and efficiency of the data.

Based on this, in the embodiment of the present invention, the aircraft 10 is connected to the remote control 20, the remote control 20 is connected to the master terminal 30, and the master terminal 30 is connected to at least one slave terminal 40. The remote control 20 can receive the control instruction transmitted by the master terminal 30 and the control instructions transmitted by the at least one slave terminal 40, and transmit the received control instructions to the aircraft 10 to control the aircraft 10, which can avoid providing each terminal with a remote control 20 to control the aircraft, thereby reducing the burden of holding remote controls, reducing a number of remote controls and reducing costs.

In addition, for the data transmitted by the aircraft 10, the aircraft 10 directly transmits the data to the remote control 20 paired with and connected to the aircraft without broadband shunting, thereby improving the efficiency of data transmission and ensuring the stability and efficiency of the data.

The aircraft 10, the remote control 20, the master terminal 30 and the at least one slave terminal 40 are described in detail below.

The aircraft 10 may be any apparatus suitable for flying. For example, the aircraft 10 may be an unmanned aerial vehicle (UAV) 10', an unmanned ship, other movable apparatuses or the like. The present invention is described below by using the UAV 10' as an example of the aircraft 10.

The UAV 10' is an unmanned aircraft with a mission payload that is operated by a remote control device or a self-provided program control apparatus. The UAV 10' may be various types of UAVs. For example, the UAV 10' may be a rotorcraft, for example, a multi-rotor aircraft propelled by a plurality of propulsion apparatuses through the air.

It should be noted that, the embodiment of the present invention is not limited thereto. The UAV 10' may alternatively be other types of UAVs, such as a fixed-wing UAV, an unmanned airship, an umbrella-wing UAV, a flapping-wing UAV or the like.

Figure 3:
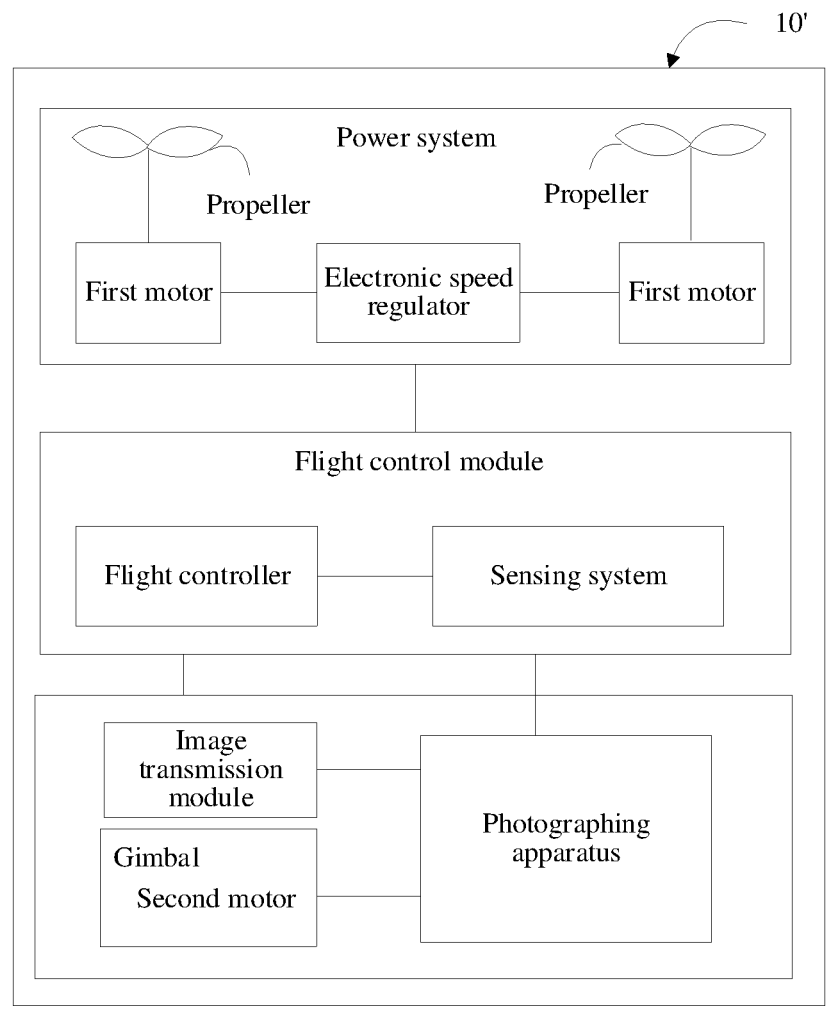
FIG. 3 is a schematic diagram of a UAV according to an embodiment of the present invention.

FIG. 3 is a schematic diagram of a UAV according to an embodiment of the present invention. The UAV 10' includes: a fuselage, a power system, a flight control module, a gimbal, a photographing apparatus, an image transmission module and the like. The flight control module and the image transmission module are disposed in the fuselage, the power system and the gimbal are mounted to the fuselage, and the photographing apparatus is mounted to the gimbal. The flight control module may be coupled with the power system, the gimbal, the photographing apparatus and the image transmission module to achieve communication.

The fuselage may include a center frame and one or more wings connected to the center frame, the one or more wings extending radially from the center frame. A number of wings may be 2, 4, 6 or the like. One or more wings are configured to carry the power system.

The power system may include an electronic speed control (referred to as an ESC for short), one or more propellers and one or more first motors corresponding to the one or more propellers.

The first motor is connected between the ESC and the propeller, and the first motor and the propeller are disposed on a corresponding arm. The first motor is configured to drive a propeller to rotate, so as to provide power for the flight of the UAV 10'. The power enables the UAV 10' to achieve movement with one or more degrees of freedom, such as forward and backward movement, up and down movement and so on.

In some embodiments, the UAV 10' is rotatable about one or more axes of rotation. For example, the foregoing rotation axis may include a roll axis, a translation axis and a pitch axis.

It can be understood that, the first motor may be a direct current (DC) motor or an alternating current (AC) motor. In addition, the first motor may be a brushless motor or a brushed motor.

The electronic speed regulator is configured to receive a driving signal generated by the flight control module, and provide a driving current to the first motor according to the driving signal to control a rotation speed of the first motor, thereby controlling the flight of the UAV 10'.

The flight control module has the capability to monitor and manipulate the flight and tasks of the UAV 10', including a set of devices for controlling the launch and recovery of the UAV 10'. The flight control module is configured to control the flight of the UAV 10'. The flight control module may include a sensing system and a flight controller.

The sensing system is configured to measure location information and status information of the UAV 10' and various components of the UAV 10', for example, three-dimensional locations, three-dimensional angles, three-dimensional speeds, three-dimensional acceleration and three-dimensional angular speeds, flight height and the like.

The sensing system may include at least one of an infrared sensor, an acoustic wave sensor, a gyroscope, an electronic compass, an inertial measurement unit (IMU), a vision sensor, a global navigation satellite system and a barometer. For example, the GNSS may be a Global Positioning System (GPS).

The flight controller is configured to control the UAV 10', for example, control the flight or photographing of the UAV 10'. It can be understood that, the flight controller may control the UAV 10' according to a pre-programmed program instruction, or may control the UAV 10' in response to one or more control instructions from other devices.

For example, the remote control 20 receives the control instruction transmitted by the master terminal 30 and may also receive the control instructions transmitted by the at least one slave terminal 40, and transmits the received control instructions to the flight controller, so that the flight controller controls the UAV 10' through the control instructions.

For example, the flight control of the UAV 10' is given by way of example. The flight controller transmits the control instruction to the electronic speed regulator to generate a driving signal, and provides a driving current to the first motor according to the driving signal to control a rotation speed of the first motor, thereby controlling the flight of the UAV 10'.

As an auxiliary photographing device, the gimbal is configured to carry the photographing apparatus. A second motor is provided on the gimbal, and the flight control module can control the gimbal. Specifically, the flight control module adjusts, by controlling the movement (such as the rotation speed) of the second motor, an angle of an image taken by the UAV 10'. The second motor may be a brushless motor or a brush motor. The gimbal may be located at the top of the fuselage or may be located at the bottom of the fuselage.

In addition, in the embodiment of the present invention, the gimbal is a part of the UAV 10'. It may be understood that in some other embodiments, the gimbal may be independent of the UAV 10'.

The photographing apparatus may be an apparatus for collecting images, such as a camera, a camera phone, a video recorder, a video camera or the like. The photographing apparatus may communicate with the flight control module and perform photograph under the control of the flight control module. For example, the flight control module controls a frequency at which the photographing apparatus takes an image, that is, how many shots per unit time; or the flight control module controls, through the gimbal, an angle at which the photographing apparatus takes an image.

The image transmission module is configured to transmit, to a wireless image transmission receiving device such as the remote control 20 or the like on the ground in real time and stably, flight information (such as attitude information) of the UAV 10' in flight in the sky or image information taken by the photographing apparatus of the UAV 10' (such as the captured image, picture, video or the like).

It can be understood that, the foregoing named components of the UAV 10' are only for identification purposes, and should not be understood as a limitation to the embodiments of the present invention.

The remote control 20 may be any suitable remote control apparatus. The remote control 20 is a remote control unit on a ground (ship) surface or an aerial platform, and controls the aircraft 10 by transmitting control instructions to the flight control module. The remote control 20 is configured to transfer data, information or instructions.

For example, the remote control 20 receives data or information transmitted by the aircraft 10 (such as image information taken by the photographing apparatus), and transmits the data or information to the master terminal 30, so as to display the flight information of the aircraft 10 on the master terminal 30 and render or display the image information taken by the aircraft 10.

In addition, the master terminal 30 transmits the data or information to at least one slave terminal 40 connected to the master terminal 30, so as to display the flight information of the aircraft 10 on the at least one slave terminal 40 and render or display the image taken by the aircraft 10, thereby achieving the effect of synchronously displaying the data or information transmitted by the aircraft 10 by the master terminal 30 and at least one slave terminal 40.

Alternatively, the remote control 20 receives the control instruction transmitted by the master terminal 30 and may also receive the control instructions transmitted by the at least one slave terminal 40, and transmits the received control instructions to the aircraft 10 to control the aircraft 10.

For example, the remote control 20 may receive the control instruction transmitted by the master terminal 30, and then transmits the control instruction to the aircraft 10 to control the aircraft 10; or the control instructions transmitted by at least one slave terminal 40 are transmitted to the master terminal 30, the remote control 20 receives the control instructions transmitted by the at least one slave terminal 40 forwarded by the master terminal 30, and the remote control 20 transmits the control instruction to the aircraft 10 to control the aircraft 10.

Moreover, when control parameters of the aircraft are set through the master terminal 30, at least one slave terminal 40 also updates the latest control parameters of the aircraft set for the master terminal 30, that is, during controlling the aircraft 10, the master terminal 30 and the at least one slave terminal 40 maintain a consistent control interface.

Usually during the flight of the aircraft 10, the aircraft 10 and the master terminal 30 or at least one slave terminal 40 are spaced apart from each other by a distance. Especially for some high-altitude photographing, the aircraft 10 and the master terminal 30 or at least one slave terminal 40 are usually far away. However, since the communication distance between the master terminal 30 or at least one slave terminal 40 and the aircraft 10 is limited, usually only a communication range with a radius of 100 meters, if the master terminal 30 or at least one slave terminal 40 is directly used to control the aircraft 10, high-altitude photographing cannot be implemented well, causing restrictions on composition and aerial photography creation scenes.

In addition, the master terminal 30 or at least one slave terminal 40 is adopted to control the aircraft 10, and the flying speed of the aircraft 10 is also limited. In addition, the touch-screen joystick is not linearly controlled, which reduces the controllability.

Therefore, in order to better control and implement remote control of the flight of the aircraft 10, it is necessary to transfer data, information or instructions through the remote control 20. The remote control 20 forwards control instructions to control the aircraft 10, which can better meet various complicated flight controls. The transmission distance of data, information or instructions is longer, and the flight speed of the aircraft 10 is also increased, so as to implement improvements in controllability, playability and aerial photography composition scenes.

The master terminal 30 may transmit the control instruction to the remote control 20. The transmitting, by the master terminal the control instruction to the remote control includes: transmitting, to the remote control 20 by the master terminal 30, the control instruction transmitted by the master terminal 30, and/or receiving, by the master terminal 30, the control instructions transmitted by the at least one slave terminal 40, and transmitting, to the remote control 20, the control instructions transmitted by the at least one slave terminal 40.

The master terminal 30 or the at least one slave terminal 40 may be any suitable electronic device, for example, a smart phone, a tablet, a personal computer (PC), a wearable device or the like.

Both the master terminal 30 and the at least one slave terminal 40 may include a communication module. The communication module of the master terminal 30 is configured to establish communication with the remote control 20 and at least one slave terminal 40, and the communication module of the at least one slave terminal 40 is configured to establish a communication connection to the master terminal 30.

The communication modules of the master terminal 30 and the at least one slave terminal 40 may be wireless communication modules or wired communication modules, for example, a USB module, a Wi-Fi module, a Bluetooth module, an infrared module, a general packet radio service (GPRS) module and the like.

In some embodiments, the master terminal 30 and the at least one slave terminal 40 further include input apparatuses. The input apparatus is configured to receive a user input operation, and the user input operation is used for setting control parameters of the aircraft, so as to generate control instructions based on the user input operation. For example, the master terminal 30 receives the user operation through its input apparatus to generate a master control instruction, or at least one slave terminal 40 receives the user operation through its input apparatus to generate a slave control instruction.

The input apparatus may be any suitable input device, such as a keyboard, a mouse, a scanner, a light pen, a touch screen, a button or the like.

In some embodiments, in order to allow the user to more intuitively understand the control status of the aircraft 10, the master terminal 30 and the at least one slave terminal 40 further include output apparatuses. The output apparatuses can implement an output function. For example, the output apparatus displays flight information of the aircraft 10 or image information taken by the aircraft 10, such as an image, a picture, a video or the like.

The output apparatus is a human-machine interface device, which may be any suitable output device, such as a display screen, a display panel and the like.

It should be noted that the aircraft control method provided in the embodiments of the present invention may further be applicable to other suitable application environments without being limited to the application environment shown in FIG. 1. For example, in the actual application process, the aircraft 10 in the application environment may further be any other suitable aircraft, such as an unmanned ship and the like.

In addition, in other application environments, a number of slave terminals in the at least one slave terminal 40 may be more or less, for example, 3, 4 or the like, that is, the number of slave terminals in the at least one slave terminal 40 is not limited herein.

Embodiment 1

Figure 4:
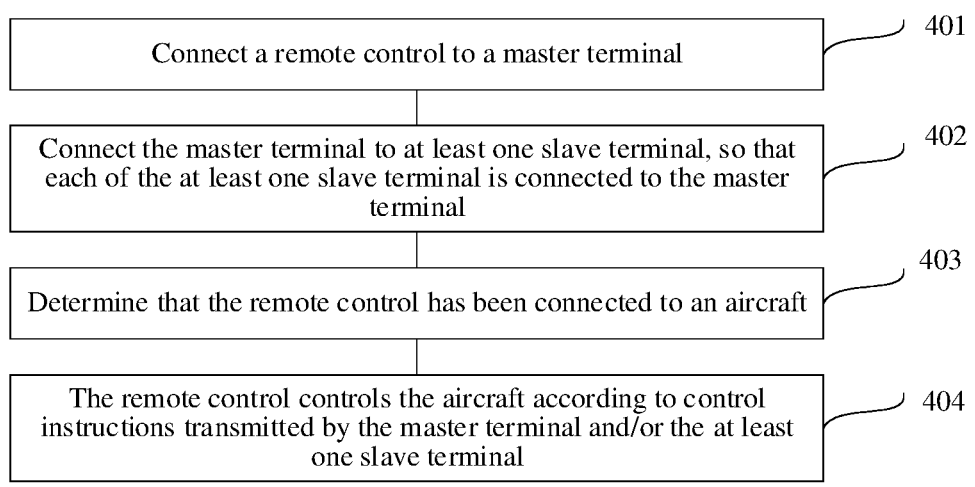
FIG. 4 is a schematic flowchart of an aircraft control method according to an embodiment of the present invention.

FIG. 4 is a schematic flowchart of an aircraft control method according to an embodiment of the present invention. The method is applicable to an aircraft to implement the control of the aircraft. The aircraft may be various types of aircrafts, for example, the aircraft 10 in FIG. 1.

Referring to FIG. 4, the aircraft control method includes the following steps.

401: Connect a remote control to a master terminal.

The remote control may be any suitable remote control device, for example, the remote control 20 in FIG. 1. The master terminal may be any suitable terminal device, for example, the master terminal 30 in FIG. 1.

The remote control is connected to the master terminal through a wired connection or a wireless connection.

In some implementations, when the remote control is connected to the master terminal through the wired connection, the wired connection includes a USB connection.

402: Connect the master terminal to at least one slave terminal, so that each of the at least one slave terminal is connected to the master terminal.

The at least one slave terminal may be any suitable terminal device, for example, the at least one slave terminal 40 in FIG. 1. A number of slave terminals in the at least one slave terminal is not limited herein, which may be 1, 2, 3, 4 or the like.

The master terminal is connected to the at least one slave terminal through a wireless connection.

In some implementations, the wireless connection includes at least one of the Wi-Fi connection and the Bluetooth connection.

403: Determine that the remote control has been connected to the aircraft.

The remote control implements the control of the aircraft by transmitting control instructions. Therefore, to implement the control of the aircraft, it is first necessary to determine that the remote control has been connected to the aircraft, so as to facilitate the transmission of the control instructions. The remote control is connected to the aircraft through a wired connection or a wireless connection. For example, communication is established through a wireless communication module.

404: The remote control controls the aircraft according to control instructions transmitted by the master terminal and/or the at least one slave terminal.

The control instruction is used for controlling the aircraft, for example, controlling the flight or photographing of the aircraft.

The control instruction transmitted by the master terminal refers to the control instruction from the master terminal, which may specifically include control instructions by receiving user operations by the master terminal and generated according to the user operations, or control instructions inputted by the user that are directly received by the master terminal. The master terminal may transmit the instruction to the remote control.

Similarly, the control instructions transmitted by the master terminal and/or the at least one slave terminal are the control instruction from the at least one slave terminal, which may specifically include control instructions by receiving user operations by the at least one slave terminal and generated according to the user operations, or control instructions inputted by the user that are directly received by the at least one slave terminal. The at least one slave terminal may transmit the control instruction to the master terminal, and the master terminal transmits the control instruction to the remote control.

Since the remote control is connected to the master terminal, and the master terminal is connected to at least one slave terminal, the remote control may receive control instructions transmitted by the master terminal and/or the at least one slave terminal. Specifically, the remote control receiving control instructions includes the following situations.
1. The remote control receives only a master control instruction transmitted by the master terminal. For example, the master terminal transmits the control instruction to the remote control, so that the remote control receives the control instruction transmitted by the master terminal.
2. The remote control receives only the control instructions transmitted by the at least one slave terminal. For example, the at least one slave terminal transmits the control instructions to the master terminal, and the master terminal forwards the control instructions to the remote control, so that the remote control receives the control instructions transmitted by the at least one slave terminal.
3: The remote control receives both the control instruction transmitted by the master terminal and the control instructions transmitted by the at least one slave terminal. For example, the master terminal transmits the control instruction transmitted by the master terminal to the remote control, so that the remote control receives the control instruction. In addition, the at least one slave terminal transmits the control instructions transmitted by the at least one slave terminal to the master terminal, and the master terminal forwards the control instructions to the remote control, so that the remote control receives the control instructions. Therefore, the remote control receives both the control instruction transmitted by the master terminal and the control instructions transmitted by the at least one slave terminal.

In some implementations, the controlling, by the remote control, the aircraft according to control instructions transmitted by the master terminal and/or the at least one slave terminal includes: controlling, by the remote control, the aircraft according to the control instructions that are transmitted by the master terminal and/or the at least one slave terminal according to a preset control instruction transmission rule, the preset control instruction transmission rule being determined by identification information carried by each of the control instructions.

In some implementations, the identification information includes at least one of the following identifiers: a time identifier, a source identifier and a function identifier.

the time identifier being used for identifying a time at which the control instruction is transmitted, the source identifier being used for identifying the control instruction as being transmitted by the master terminal or being transmitted by a slave terminal, and the function identifier being used for identifying a function implemented by the control instruction.

During the master-slave control of the aircraft, since the master terminal and the slave terminal have different control rights, control priorities of the master terminal to the aircraft and control priorities of at least one slave terminal to the aircraft are different from each other either. In the embodiment of the present invention, the control priorities of the master terminal to the aircraft are higher than the control priorities of the at least one slave terminal to the aircraft, that is, control priorities of the control instruction transmitted by the master terminal are higher than control priorities of the control instructions transmitted by the at least one slave terminal.

For example, for an application scenario in which an instructor of an aircraft leads flight, the instructor operates the master terminal to control the aircraft through the control instruction transmitted by the master terminal, and the students operate at least one slave terminal to control the aircraft through the control instructions usually transmitted by the at least one slave terminal. A control mode in which the control priorities of the control instruction transmitted by the master terminal are higher than the control priorities of the control instruction transmitted by the at least one slave terminal is adopted, so as to better implement the teaching of the aircraft.

Therefore, during controlling the aircraft by the remote control, the remote control may first detect whether there is a control instruction transmitted by the master terminal, so as to transmit the control instruction to the aircraft based on a detection result to control the aircraft.

In some implementations, when the identification information includes the source identifier, and the controlling, by the remote control, the aircraft according to control instructions that are transmitted by the master terminal and/or the at least one slave terminal according to a preset control instruction transmission rule includes: detecting, according to the source identifiers, whether the control instruction transmitted by the master terminal is present in the control instructions; and if so, controlling, by the remote control, the aircraft according to the control instruction transmitted by the master terminal.

Since a case that the remote control receives a plurality of control instructions exists, and the remote control can transmit only one control instruction at the same moment, the plurality of control instructions need to be successively transmitted to the aircraft.

In some implementations, when the identification information includes the time identifier, the controlling, by the remote control, the aircraft according to control instructions that are transmitted by the master terminal and/or the at least one slave terminal according to a preset control instruction transmission rule includes: controlling, by the remote control, the aircraft according to a chronological order in which the control instructions are received, the chronological order in which the control instructions are received.

When the identification information carried by the control instructions includes a plurality of identifiers, in order to avoid confusion of controlling the aircraft by the remote control, the remote control transmits the control instructions to the aircraft based on the priorities of the identifiers of the plurality of pieces of identification information to control the aircraft.

Specifically, the identification information includes at least two of the time identifier, the source identifier and the function identifier, and the controlling, by the remote control, the aircraft according to control instructions transmitted by the master terminal and/or the at least one slave terminal includes: determining, by the remote control, priorities of the identifiers in the identification information; and transmitting, by the remote control, to the aircraft according to the priorities, the control instructions transmitted by the master terminal and/or the at least one slave terminal, to control the aircraft.

Figure 5:
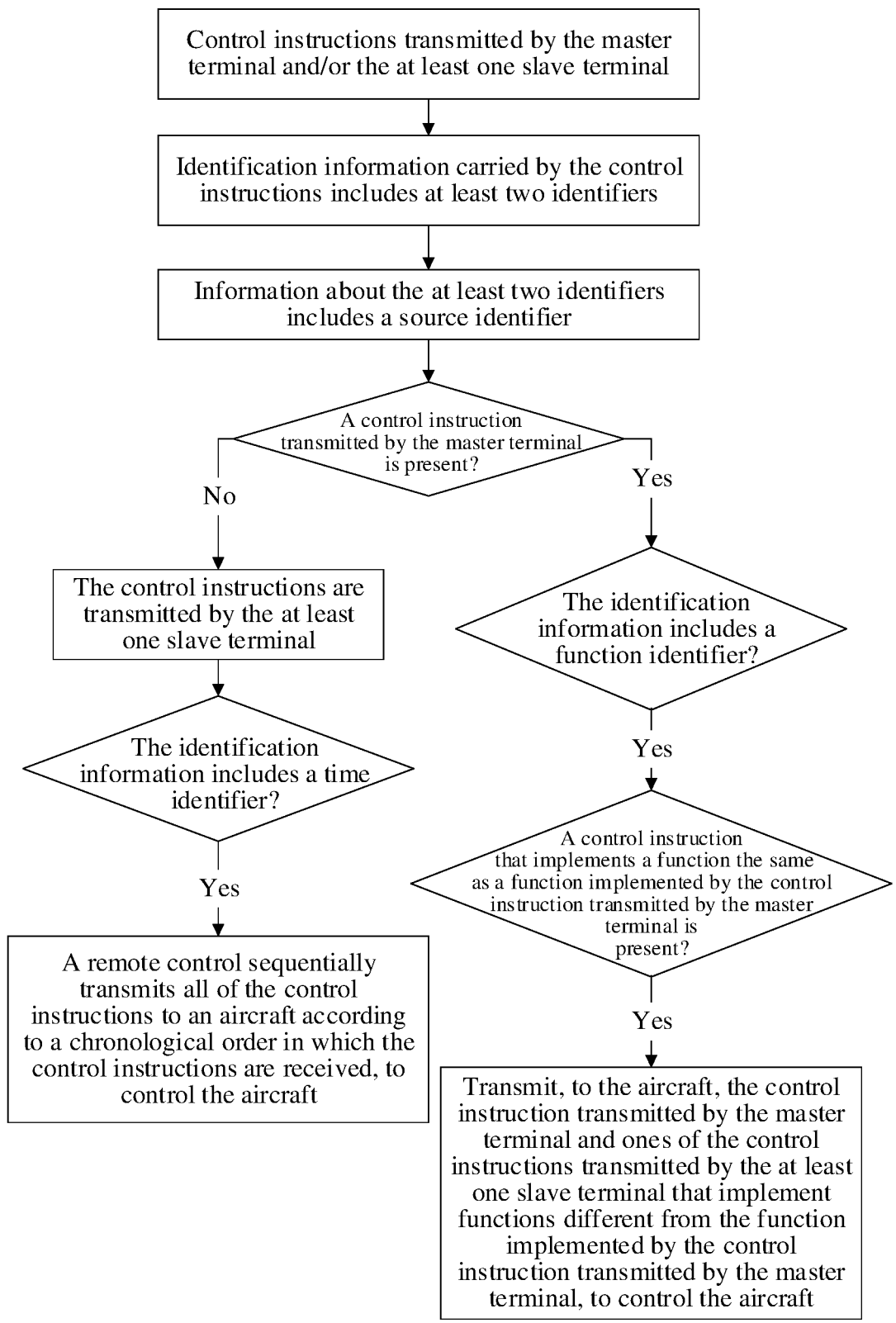
FIG. 5 is a schematic diagram of a specific process of transmitting, by a remote control to the aircraft according to priorities, a control instruction transmitted by a master terminal and/or at least one slave terminal, to control the aircraft according to an embodiment of the present invention.

With reference to FIG. 5 below, the transmitting, to the aircraft according to the priorities, the control instructions transmitted by the master terminal and/or the at least one slave terminal, to control the aircraft is specifically described.

The transmitting, by the remote control to the aircraft according to the priorities, the control instructions transmitted by the master terminal and/or the at least one slave terminal, to control the aircraft includes the following situations.

1. When the at least two kinds of identification information include the source identifier, the transmitting, by the remote control to the aircraft according to the priorities, control instructions transmitted by the master terminal and/or the at least one slave terminal, to control the aircraft includes:

determining that the control instructions are transmitted by the at least one slave terminal when it is detected, according to the source identifiers, that a control instruction transmitted by the master terminal is not present in the control instructions;

detecting whether the identification information of the control instruction includes the time identifiers; and transmitting, by the remote control, all of the control instructions sequentially to the aircraft according to a chronological order in which the control instructions are received, to control the aircraft, if the identification information includes the time identifiers, the chronological order in which the control instructions are received being determined by the time identifiers.

2. When the at least two kinds of identification information include the source identifier, the transmitting, by the remote control to the aircraft according to the priorities, the control instructions transmitted by the master terminal and/or the at least one slave terminal, to control the aircraft includes:

detecting whether the identification information of a control instruction transmitted by the master terminal and control instructions transmitted by the at least one slave terminal includes the function identifiers, when it is detected, according to the source identifiers, that the control instruction transmitted by the master terminal and the control instructions transmitted by the at least one slave terminal are present in the control instructions;

detecting, according to the function identifiers, whether a control instruction that implements a function the same as a function implemented by the control instruction transmitted by the master terminal is present in the control instructions transmitted by the at least one slave terminal, if the identification information includes the function identifiers; and transmitting, to the aircraft, the control instruction transmitted by the master terminal and ones of the control instructions transmitted by the at least one slave terminal that implement functions different from the function implemented by the control instruction transmitted by the master terminal, to control the aircraft, when it is detected that the control instruction that implements the function the same as the function implemented by the control instruction transmitted by the master terminal is present.

Further, the transmitting, by the remote control to the aircraft, the control instruction transmitted by the master terminal and ones of the control instructions transmitted by the at least one slave terminal that implement functions different from the function implemented by the control instruction transmitted by the master terminal includes:

transmitting the control instruction transmitted by the master terminal to the aircraft;

detecting whether the identification information of the ones of the control instructions transmitted by the at least one slave terminal that implement the functions different from the function implemented by the control instruction transmitted by the master terminal includes the time identifiers; and sequentially transmitting, by the remote control, all of the ones of the control instructions transmitted by the at least one slave terminal that implement the functions different from the function implemented by the control instruction transmitted by the master terminal to the aircraft according to a chronological order in which the control instructions are received, if the identification information includes the time identifiers, the chronological order in which the ones of the control instructions transmitted by the at least one slave terminal that implement the functions different from the function implemented by the control instruction transmitted by the master terminal are received being determined by the time identifiers carried by the control instructions.

Since the control priorities of the control instruction transmitted by the master terminal are higher than the control priorities of the control instructions transmitted by the at least one slave terminal, ones of the control instructions transmitted by the at least one slave terminal that implement the same function as the function implemented by the master control instruction cause the function executed by the aircraft to be the same as the control instruction transmitted by the master terminal. Therefore, when the control instruction that implements a function the same as the function implemented by the control instruction transmitted by the master terminal is present in the control instructions transmitted by the at least one slave terminal that implement, there is no need to transmit, to the aircraft, the control instruction that implements the function the same as that implemented by the control instruction transmitted by the master terminal. In the case of the same control of the aircraft, the method can reduce a quantity of control instructions transmitted by the remote control to the aircraft and reduce the burden of data transmission.

It should be noted that, for technical details not described in detail in steps 401-404 in the embodiments of the present invention, reference may be made to the specific description in the application scenario of the foregoing aircraft control method.

In the embodiment of the present invention, the remote control is connected to the master terminal, and the master terminal is connected to the at least one slave terminal. The remote control can receive the control instruction transmitted by the master terminal and the control instructions transmitted by the at least one slave terminal, and transmit the received control instructions to the aircraft to control the aircraft, which can avoid providing each terminal with a remote control to control the aircraft, thereby reducing the burden of holding remote controls, reducing a number of remote controls and reducing costs.

Embodiment 2

FIG. 4 is a schematic flowchart of another aircraft control method according to an embodiment of the present invention. The method is applicable to an aircraft to implement the control of the aircraft. The aircraft may be various types of aircrafts, for example, the aircraft 10 in FIG. 1.

Figure 6:
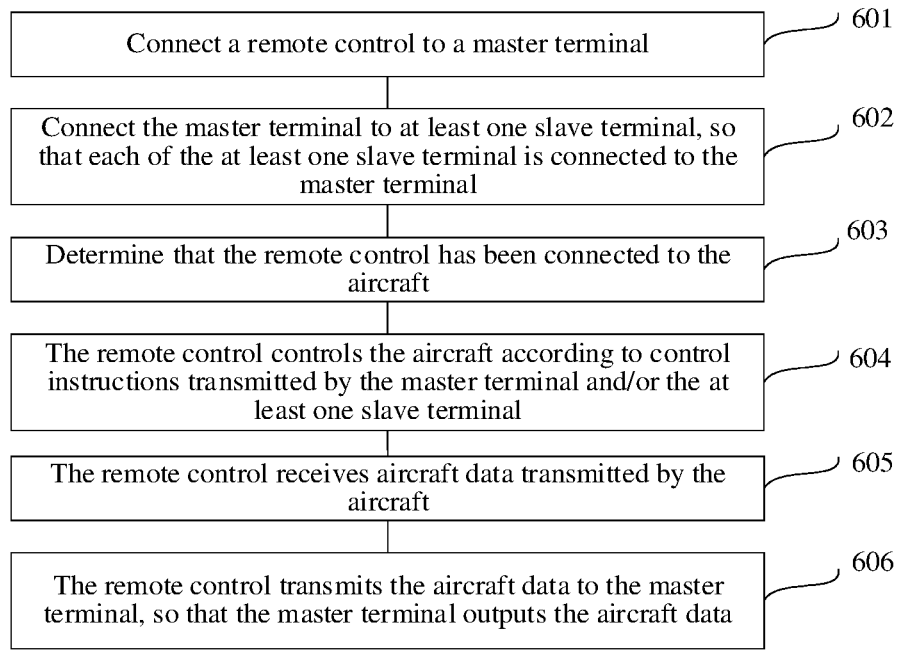
FIG. 6 is a schematic flowchart of another aircraft control method according to an embodiment of the present invention.

Referring to FIG. 6, the aircraft control method includes the following steps.

601: Connect a remote control to a master terminal.

602: Connect the master terminal to at least one slave terminal, so that each of the at least one slave terminal is connected to the master terminal.

603: Determine that the remote control has been connected to the aircraft.

604: The remote control controls the aircraft according to control instructions transmitted by the master terminal and/or the at least one slave terminal.

605: The remote control receives aircraft data transmitted by the aircraft.

The remote control, as a data transfer device between the aircraft and the master terminal, not only can transmit the received control instructions transmitted by the master terminal and/or the at least one slave terminal to the aircraft to control the aircraft, but also can receive the aircraft data transmitted by the aircraft, so that a user holding the master terminal or at least one slave terminal can operate, based on the aircraft data fed back by the aircraft, the master terminal or the at least one slave terminal to control the aircraft.

The aircraft data includes flight information of the aircraft and image information taken by the aircraft. The flight information may be attitude information of the aircraft, such as the flying speed, acceleration, angular speed, flying height and the like of the aircraft. The image information taken by the aircraft may be an image, a video or the like taken by the aircraft.

Since the aircraft is connected to the remote control, the remote control is connected to the master terminal, and the master terminal is connected to at least one slave terminal, for the aircraft data transmitted by the aircraft, one remote control completely receives all of the aircraft data transmitted by the aircraft without broadband shunting, so as to avoid mutual interference during the transmission of various data during broadband shunting, thereby improving the efficiency of data transmission and ensuring the stability and efficiency of the data.

606: The remote control transmits the aircraft data to the master terminal, so that the master terminal outputs the aircraft data.

The transmitting, by the remote control, the aircraft data to the master terminal, so that the master terminal outputs the aircraft data includes: transmitting, by the remote control, the aircraft data to the master terminal, so that the master terminal displays the aircraft data, and causing the master terminal to transmit the aircraft data to the at least one slave terminal, so that the at least one slave terminal displays the aircraft data.

Display interfaces of the master terminal and the at least one slave terminal are consistent, so as to realize synchronization control between the master terminal and the at least one slave terminal. For example, when the master terminal displays an aircraft parameter interface, the at least one slave terminal also displays the aircraft parameter interface, and aircraft parameters on the aircraft parameter interface of the master terminal and the at least one slave terminal are the same.

It should be noted that, in the embodiment of the present invention, those skilled in the art may understand, according to the descriptions of the embodiments of the present invention, that in different embodiments, if there is no contradiction, steps 601-606 may be performed in different sequences. For example, steps 605-606 are first performed, and then steps 601-604 are performed.

It should further be noted that, for technical details that are not specifically described in steps 601-606 in this embodiment of the present invention, reference may be made to the specific description in the foregoing embodiment.

In the embodiment of the present invention, the remote control is connected to the master terminal, and the master terminal is connected to the at least one slave terminal. The remote control can receive the control instruction transmitted by the master terminal and the control instructions transmitted by the at least one slave terminal, and transmit the received control instructions to the aircraft to control the aircraft, which can avoid providing each terminal with a remote control to control the aircraft, thereby reducing the burden of holding remote controls, reducing a number of remote controls and reducing costs.

Moreover, the remote control completely receives all of the aircraft data transmitted by the aircraft without broadband shunting, so as to avoid mutual interference during the transmission of various data during broadband shunting, thereby improving the efficiency of data transmission and ensuring the stability and efficiency of the data.

Embodiment 3

Figure 7:
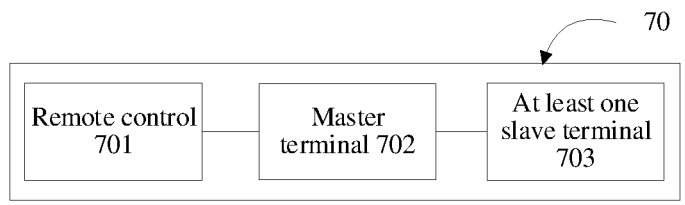
FIG. 7 is a schematic diagram of a flight control system according to an embodiment of the present invention.

FIG. 7 is a schematic diagram of a flight control system according to an embodiment of the present invention. The flight control system is configured to control an aircraft. As shown in FIG. 7, the flight control system 70 includes: a remote control 701, a master terminal 702 and at least one slave terminal 703.

The remote control 701 is connected to the master terminal 702. The master terminal 702 is connected to the at least one slave terminal 703, so that each of the at least one slave terminal 703 is connected to the master terminal 702. The remote control 701 is connected to the aircraft.

In some implementations, the remote control 701 is connected to the master terminal 702 through a wired connection or a wireless connection. When the remote control 701 is connected to the master terminal 702 through the wired connection, the wired connection includes a USB connection.

In some implementations, the master terminal 702 is connected to the at least one slave terminal 703 through the wireless connection. The wireless connection includes at least one of a Wi-Fi connection and a Bluetooth connection.

Figure 8:
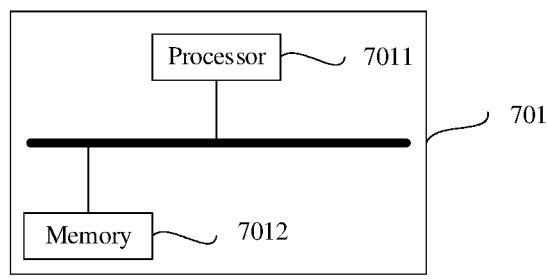
FIG. 8 is a schematic diagram of a hardware structure of a remote control according to an embodiment of the present invention.

As shown in FIG. 8, the remote control 701 includes: at least one processor 7011; and a memory 7012 communicatively connected to the at least one processor 7011. In FIG. 8, one processor 7011 is used as an example.

The processor 7011 and the memory 7012 may be connected by using a bus or in another manner. A connection by using the bus is used as an example in FIG. 8.

The memory 7012, as a non-volatile computer-readable storage medium, may be configured to store a non-volatile software program, a non-volatile computer-executable program and module, such as the program instructions/modules corresponding to the remote control in the aircraft control method in the embodiment of the present invention. The processor 7011 executes various functional applications and data processing of the remote control 701 by running the non-volatile software program, instruction and module stored in the memory 7012, that is, performs the step of controlling the aircraft according to control instructions transmitted by the master terminal and/or the at least one slave terminal.

The memory 7012 may include a program storage area and a data storage area, where the program storage area may store an operating system, an application required for at least one function, and the data storage area may store data and the like created according to use of the remote control 701.

In addition, the memory 7012 may include a high speed random access memory, and may also include a non-volatile memory, such as at least one magnetic disk storage device, a flash memory, or another volatile solid-state storage device.

In some embodiments, optionally, the memory 7012 may include remote memories that are disposed relative to the processor 7011, and these remote memories may be connected to the remote control 701 via a network. Examples of the network include, but not limited to, the Internet, an intranet, a local area network, a mobile communications network and a combination thereof.

The one or more instructions/modules are stored in the memory 7012, the one or more instructions/modules, when executed by the one or more processors 7011, performing the step of: controlling the aircraft according to control instructions transmitted by the master terminal and/or the at least one slave terminal.

In some implementations, the controlling, by the at least one processor 7011, the aircraft according to control instructions transmitted by the master terminal and/or the at least one slave terminal includes: controlling, by the remote control, the aircraft according to control instructions that are transmitted by the master terminal and/or the at least one slave terminal according to a preset control instruction transmission rule, the preset control instruction transmission rule being determined by identification information carried by each of the control instructions.

The identification information includes at least one of the following identifiers: a time identifier, a source identifier and a function identifier.

The time identifier is used for identifying a time at which the control instruction is transmitted, the source identifier is used for identifying whether the control instruction is transmitted by the master terminal or the slave terminal, and the function identifier is used for identifying a function implemented by the control instruction.

In some embodiments, the identification information includes at least two of the time identifier, the source identifier and the function identifier, and the controlling, by the at least one processor 7011, the aircraft according to control instructions transmitted by the master terminal and/or the at least one slave terminal includes: determining priorities of the identifiers in the identification information; and transmitting, to the aircraft according to the priorities, the control instructions transmitted by the master terminal and/or the at least one slave terminal, to control the aircraft.

In some embodiments, the identification information includes the source identifier, and the controlling, by the at least one processor 7011, the aircraft according to control instructions that are transmitted by the master terminal and/or the at least one slave terminal according to a preset control instruction transmission rule includes: detecting, according to the source identifiers, whether a control instruction transmitted by the master terminal is present in the control instructions; and if so, controlling, by the remote control, the aircraft according to the control instruction transmitted by the master terminal.

In some implementations, the identification information includes the time identifier, the controlling, by the at least one processor 7011, the aircraft according to control instructions that are transmitted by the master terminal and/or the at least one slave terminal according to a preset control instruction transmission rule includes: controlling, by the remote control, the aircraft according to a chronological order in which the control instructions are received, the chronological order in which the control instructions are received being determined by the time identifiers.

In some implementations, the identification information includes the source identifier, and the transmitting, by the at least one processor 7011, to the aircraft according to the priorities, the control instructions transmitted by the master terminal and/or the at least one slave terminal, to control the aircraft includes:
  determining that the control instructions are transmitted by the at least one slave terminal when it is detected, according to the source identifiers, that a control instruction transmitted by the master terminal is not present in the control instructions;
  detecting whether the identification information of the control instructions include the time identifiers; and
  transmitting, by the remote control, all of the control instructions sequentially to the aircraft according to a chronological order in which the control instructions are received, to control the aircraft, if the identification information includes the time identifiers,
  the chronological order in which the control instructions are received being determined by the time identifiers.

In some implementations, the identification information includes the source identifier the transmitting, by the at least one processor 7011, to the aircraft according to the priorities, the control instructions transmitted by the master terminal and/or the at least one slave terminal, to control the aircraft includes:
  detecting whether the identification information of a control instruction transmitted by the master terminal and control instructions transmitted by the at least one slave terminal includes the function identifiers, when it is detected, according to the source identifiers, that the control instruction transmitted by the master terminal and the control instructions transmitted by the at least one slave terminal are present in the control instructions;
  detecting, according to the function identifiers, whether a control instruction that implements a function the same as a function implemented by the control instruction transmitted by the master terminal is present in the control instructions transmitted by the at least one slave terminal, if the identification information includes the function identifiers; and
  transmitting, to the aircraft, the control instruction transmitted by the master terminal and ones of the control instructions transmitted by the at least one slave terminal that implement functions different from the function implemented by the control instruction transmitted by the master terminal, to control the aircraft, when it is detected that the control instruction that implements the function the same as the function implemented by the control instruction transmitted by the master terminal is present.

Further, the transmitting, by the at least one processor 7011 to the aircraft, the control instruction transmitted by the master terminal and ones of the control instructions transmitted by the at least one slave terminal that implement functions different from the function implemented by the control instruction transmitted by the master terminal includes:
  transmitting the control instruction transmitted by the master terminal to the aircraft;
  detecting whether the identification information of the ones of the control instructions transmitted by the at least one slave terminal that implement the functions different from the function implemented by the control instruction transmitted by the master terminal includes the time identifiers; and sequentially transmitting, by the remote control, all of the ones of the control instructions transmitted by the at least one slave terminal that implement the functions different from the function implemented by the control instruction transmitted by the master terminal to the aircraft according to a chronological order in which the control instructions are received, if the identification information includes the time identifiers, the chronological order in which the ones of the control instructions transmitted by the at least one slave terminal that implement the functions different from the function implemented by the control instruction transmitted by the master terminal are received being determined by the time identifiers carried by the control instructions.

Figure 9:
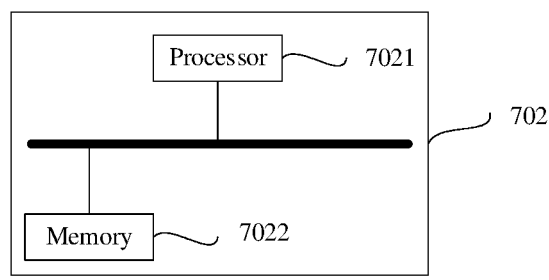
FIG. 9 is a schematic diagram of a hardware structure of a master terminal according to an embodiment of the present invention.

As shown in FIG. 9, the master terminal 702 includes: at least one processor 7021; and a memory 7022 communicatively connected to the at least one processor 7021. In FIG. 9, one processor 7021 is used as an example.

The processor 7021 and the memory 7022 may be connected through a bus or in other manners and are, for example, connected through a bus in FIG. 9.

The memory 7022, as a non-volatile computer-readable storage medium, may be configured to store a non-volatile software program, a non-volatile computer-executable program and module, such as the program instructions/modules corresponding to the master terminal in the aircraft control method in the embodiment of the present invention. The processor 7021 executes various functional applications and data processing of the master terminal 702 by running the non-volatile software program, instruction and module stored in the memory 7022, that is, performs the step of transmitting, to the remote control, control instructions transmitted by the master terminal and/or the at least one slave terminal, to control the aircraft.

The memory 7022 may include a program storage area and a data storage area. The program storage area may store an operating system, an application program required for at least one function. The data storage area may store data and the like created according to use of the master terminal 702.

In addition, the memory 7022 may include a high speed random access memory, and may also include a non-volatile memory, such as at least one magnetic disk storage device, a flash memory, or another volatile solid-state storage device.

In some embodiments, the memory 7022 may optionally include remotely disposed memories relative to the processor 7021, these remote memories being connected to the master terminal 702 via a network. Examples of the network include, but not limited to, the Internet, an intranet, a local area network, a mobile communications network and a combination thereof.

The one or more instructions/modules are stored in the memory 7022, the one or more instructions/modules, when executed by the one or more processors 7021, performing the step of receiving a user input operation.

The user input operation is used for setting control parameters of the aircraft. The control parameters of the aircraft include but are not limited to: flight control parameters and paragraphing control parameters.

The flight control parameters refer to parameters related to the flight control of the aircraft, for example, the flight speed, acceleration, and flight altitude of the aircraft. By setting the flight control parameters of the aircraft, the aircraft can fly according to the set parameters.

The flight control parameters refer to parameters related to the paragraphing control of the aircraft, for example, a focal length parameter, an exposure parameter, a white balance parameter and the like of the paragraphing apparatus of the aircraft. By setting the paragraphing control parameters of the aircraft, the paragraphing apparatus of the aircraft can collect images according to the set parameters.

The one or more instructions/modules are stored in the memory 7022, the one or more instructions/modules, when executed by the one or more processors 7021, further performing the step of generating a control instruction according to the user input operation.

For example, upon receipt of the user input operation for setting the flight control parameters of the aircraft, a control instruction for controlling the flight of the aircraft may be generated, so that the aircraft can subsequently fly according to the flight control parameters set by the user.

The one or more instructions/modules are stored in the memory 7022, the one or more instructions/modules, when executed by the one or more processors 7021, further performing the step of generating broadcast information.

In order to ensure that the interface displayed by at least one slave terminal 703 is always the same as the interface displayed by the master terminal 702, when receiving the user input operation, broadcast information is generated, so that the at least one slave terminal 703 can simultaneously update the same control parameter of the aircraft as the master terminal 702.

Similarly, when the at least one slave terminal 703 receives the user input operation, broadcast information is also generated, so that the master terminal 702 can simultaneously update the same control parameter of the aircraft as the at least one slave terminal 703.

In some embodiments, when the master terminal 702 receives other operations from the user, for example, when the user performs a key operation, in order to keep the interface displayed by the at least one slave terminal 703 the same as the interface displayed by the master terminal 702, the master terminal 702 also generates a broadcast information for identifying a key operation, so that the slave terminal 703 that receives the broadcast information can perform the key function. The at least one slave terminal 703 receiving the key operation of the user can implement the similar function as the master terminal 702 receiving the key operation of the user, and therefore details are not described herein again.

The one or more modules are stored in the memory 7022, the one or more modules, when executed by the one or more processors 7021, further performing the step of: broadcasting the broadcast information, so that the control parameters of the aircraft set by one of the at least one slave terminal that receives the broadcast information are the same as that set by the master terminal.

For example, when the master terminal 702 receives the user input operation, so that one of the control parameters of the aircraft of the master terminal 702 is changed, the slave terminal 703 that receives the broadcast information also performs updating.

When the master terminal 702 receives the user input operation, so that the master terminal 702 enters an interface such as a flight task execution interface, the slave terminal 703 that receives the broadcast information also enters an identical interface. Since the at least one slave terminal 703 receiving the user input operation can implement the similar function as the master terminal 702, details are not described herein again. Through the above method, it is ensured that the interfaces displayed by the master terminal 702 and the at least one slave terminal 703 for the user are always the same, thereby implementing synchronous control of the aircraft.

The one or more instructions/modules are stored in the memory 7022, the one or more instructions/modules, when executed by the one or more processors 7021, further performing the step of: receiving the control instructions transmitted by the at least one slave terminal.

The processor 7021 is connected to the at least one slave terminal 703, so that the processor 7021 can receive the control instruction transmitted by the at least one slave terminal 703, so that the subsequent control instruction transmitted by the at least one slave terminal 703 and/or the control instruction transmitted by the master terminal 702 are transmitted to the remote control 701 to control the aircraft through the remote control 701.

The one or more instructions/modules are stored in the memory 7022, the one or more instructions/modules, when executed by the one or more processors 7021, further performing the step of: transmitting the control instructions transmitted by the master terminal and/or the at least one slave terminal to the remote control, so that the remote control can control the aircraft according to the control instructions transmitted by the master terminal and/or the at least one slave terminal.

In some embodiments, the one or more instructions/modules are stored in the memory 7022, the one or more instructions/modules, when executed by the one or more processors 7021, further performing the step of: receiving aircraft data forwarded by the remote control.

The aircraft data is from the aircraft. The aircraft data includes flight information of the aircraft and image information taken by the aircraft.

Since the aircraft is connected to the remote control 701, the remote control 701 is connected to the master terminal 702, and the master terminal 702 is connected to the at least one slave terminal 703, the aircraft data received by the master terminal 702 is all of the aircraft data transmitted by the aircraft directly received by the remote control without broadband shunting, so as to avoid mutual interference during the transmission of various data during broadband shunting, thereby improving the efficiency of data transmission and ensuring the stability and efficiency of the data.

In some embodiments, the one or more instructions/modules are stored in the memory 7022, the one or more instructions/modules, when executed by the one or more processors 7021, further performing the step of: outputting the aircraft data.

The outputting the aircraft data includes: displaying the aircraft data, and transmitting the aircraft data to the at least one slave terminal, so that the at least one slave terminal displays the aircraft data, thereby ensuring that the interfaces displayed by the master terminal and the at least one slave terminal for the user are always the same.

It should be noted that the remote control 701 may be the remote control 20 in FIG. 1, the master terminal 702 may be the master terminal 30 in FIG. 1, and the at least one slave terminal 703 may be the at least one slave terminal 40 in FIG. 1. For technical details not described in detail in this embodiment, reference may be made to the specific description of the foregoing embodiments.

In the embodiment of the present invention, the remote control 701 of the flight control system 70 is connected to the master terminal 702, and the master terminal 702 is connected to at least one slave terminal 703. The remote control 701 can receive both the control instructions transmitted by the master terminal 702 and the control instructions transmitted by the at least one slave terminal 703, and transmit the received control instructions to the aircraft to control the aircraft, which can avoid providing each terminal with a remote control to control the aircraft, thereby reducing the burden of holding remote controls and reducing costs.

In addition, the master terminal 702 broadcasts the broadcast information, so that the control parameters of the aircraft set by one of the at least one slave terminal 703 that receives the broadcast information are the same as that set by the master terminal 702, so as to implement synchronous control of the master terminal 702 and the at least one slave terminal 703.

The described apparatus embodiment is merely an example. The modules described as separate parts may or may not be physically separate, and parts displayed as modules may or may not be physical modules, may be located in one position, or may be distributed on a plurality of network modules. Some or all of the modules may be selected according to actual needs to implement the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the embodiments may be implemented by a computer program instructing relevant hardware. The program may be stored in a computer-readable storage medium. During execution of the program, the processes of the method embodiments may be performed. The foregoing storage medium may be a magnetic disk, an optical disc, a read-only memory (ROM), a random access memory (RAM) or the like.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for controlling aircraft, performed by an aircraft, the method comprising:
   connecting a remote control to a master terminal;
   connecting the master terminal to at least one slave terminal, so that each of the at least one slave terminal is connected to the master terminal;
   determining that the remote control has been connected to the aircraft; and
   controlling, by the remote control, the aircraft according to control instructions transmitted by the master terminal and/or the at least one slave terminal;

controlling, by the remote control, the aircraft according to the control instructions that are transmitted by the master terminal and/or the at least one slave terminal according to a preset control instruction transmission rule, the preset control instruction transmission rule being determined by identification information carried by each of the control instructions;

wherein the identification information comprises at least two of a time identifier, a source identifier and a function identifier, the time identifier being used for identifying a time at which the control instruction is transmitted, the source identifier being used for identifying the control instruction as being transmitted by the master terminal or being transmitted by the at least one slave terminal, and the function identifier being used for identifying a function implemented by the control instruction;

the controlling, by the remote control, the aircraft according to the control instructions transmitted by the master terminal and/or the at least one slave terminal comprises:

determining, by the remote control, priorities of the identifiers in the identification information; and transmitting, by the remote control to the aircraft according to the priorities, the control instructions transmitted by the master terminal and/or the at least one slave terminal, to control the aircraft;

detecting whether the identification information of a control instruction transmitted by the master terminal and control instructions transmitted by the at least one slave terminal comprises the function identifiers, when it is detected, according to the source identifiers, that the control instruction transmitted by the master terminal and the control instructions transmitted by the at least one slave terminal are present in the control instructions;

detecting, according to the function identifiers, whether a control instruction that implements a function the same as a function implemented by the control instruction transmitted by the master terminal is present in the control instructions transmitted by the at least one slave terminal, when the identification information comprises the function identifier; and transmitting, to the aircraft, the control instruction transmitted by the master terminal and at least one of the control instructions transmitted by the at least one slave terminal that implement functions different from the function implemented by the control instruction transmitted by the master terminal, to control the aircraft, when it is detected that the control instruction that implements the function the same as the function implemented by the control instruction transmitted by the master terminal is present.

2. The method according to claim 1, wherein the remote control is connected to the master terminal through a wired connection or a wireless connection.

3. The method according to claim 1, wherein the remote control is connected to the master terminal through a wired connection, the wired connection comprising a universal serial bus (USB) connection.

4. The method according to claim 1, wherein the master terminal is connected to the at least one slave terminal through a wireless connection.

5. The method according to claim 4, wherein the wireless connection comprises at least one of a Wi-Fi connection and a Bluetooth connection.

6. The method according to claim 1, wherein the identification information comprises the source identifier, and the controlling, by the remote control, the aircraft according to control instructions that are transmitted by the master terminal and/or the at least one slave terminal according to a preset control instruction transmission rule comprises:

detecting, according to the source identifiers, whether a control instruction transmitted by the master terminal is present in the control instructions; and when the control instruction transmitted by the master terminal is present in the control instructions, controlling, by the remote control, the aircraft according to the control instruction transmitted by the master terminal.

7. The method according to claim 1, wherein the identification information comprises the time identifier, and the controlling, by the remote control, the aircraft according to control instructions that are transmitted by the master terminal and/or the at least one slave terminal according to a preset control instruction transmission rule comprises:

controlling, by the remote control, the aircraft according to a chronological order in which the control instructions are received, the chronological order in which the control instructions are received being determined by the time identifier.

8. The method according to claim 1, wherein the identification information comprises the source identifier, and the transmitting, by the remote control to the aircraft according to the priorities, the control instructions transmitted by the master terminal and/or the at least one slave terminal, to control the aircraft comprises:

determining that the control instructions are transmitted by the at least one slave terminal, when it is detected, according to the source identifier, that a control instruction transmitted by the master terminal is not present in the control instructions;

detecting whether the identification information of the control instructions comprises the time identifier; and transmitting, by the remote control, all of the control instructions sequentially to the aircraft according to a chronological order in which the control instructions are received, to control the aircraft, when the identification information comprises the time identifier, the chronological order in which the control instructions are received is determined by the time identifier.

9. The method according to claim 1, wherein the transmitting, by the remote control to the aircraft, the control instruction transmitted by the master terminal and ones of the control instructions transmitted by the at least one slave terminal that implement functions different from the function implemented by the control instruction transmitted by the master terminal comprises:

transmitting the control instruction transmitted by the master terminal to the aircraft;

detecting whether the identification information of the ones of the control instructions transmitted by the at least one slave terminal that implement the functions different from the function implemented by the control instruction transmitted by the master terminal comprises the time identifier; and sequentially transmitting, by the remote control, all of the ones of the control instructions transmitted by the at least one slave terminal that implement the functions different from the function implemented by the control instruction transmitted by the master terminal to the aircraft according to a chronological order in which the control instructions are received, in response to the identification information comprises the time identifier, the chronological order in which the ones of the control instructions transmitted by the at least one slave terminal that implement the functions different from the function implemented by the control instruction transmitted by the master terminal are received being determined by the time identifier carried by the control instructions.

10. A system for controlling aircraft, configured to control an aircraft, the system comprising a remote control, a master terminal and at least one slave terminal,
the remote control being connected to the master terminal, the master terminal being connected to the at least one slave terminal, so that each of the at least one slave terminal is connected to the master terminal, and the remote control being connected to the aircraft;
the remote control comprising:
at least one processor; and
a memory communicatively connected to the at least one processor, wherein
the memory stores instructions executable by the at least one processor, the instructions, when executed by the at least one processor, causing the at least one processor to:
control the aircraft according to control instructions transmitted by the master terminal and/or the at least one slave terminal;
controlling, by the remote control, the aircraft according to control instructions that are transmitted by the master terminal and/or the at least one slave terminal according to a preset control instruction transmission rule, the preset control instruction transmission rule being determined by identification information carried by each of the control instructions;
wherein the identification information comprises at least two of a time identifier, a source identifier and a function identifier;
the time identifier being used for identifying a time at which the control instruction is transmitted, the source identifier being used for identifying the control instruction as being transmitted by the master terminal or being transmitted by the at least one slave terminal, and the function identifier being used for identifying a function implemented by the control instruction;
the controlling, by the at least one processor, the aircraft according to control instructions transmitted by the master terminal and/or the at least one slave terminal comprises:
determining priorities of the identifiers in the identification information; and
transmitting, to the aircraft according to the priorities, the control instructions transmitted by the master terminal and/or the at least one slave terminal, to control the aircraft;
wherein the identification information comprises the source identifier, and the transmitting, by the at least one processor to the aircraft according to the priorities, the control instructions transmitted by the master terminal and/or the at least one slave terminal, to control the aircraft comprises:
detecting whether the identification information of a control instruction transmitted by the master terminal and control instructions transmitted by the at least one slave terminal comprises the function identifiers, when it is detected, according to the source identifiers, that the control instruction transmitted by the master terminal and the control instructions transmitted by the at least one slave terminal are present in the control instructions;
detecting, according to the function identifiers, whether a control instruction that implements a function the same as a function implemented by the control instruction transmitted by the master terminal is present in the control instructions transmitted by the at least one slave terminal, when the identification information comprises the function identifiers; and
transmitting, to the aircraft, the control instruction transmitted by the master terminal and ones of the control instructions transmitted by the at least one slave terminal that implement functions different from the function implemented by the control instruction transmitted by the master terminal, to control the aircraft, when it is detected that the control instruction that implements the function the same as the function implemented by the control instruction transmitted by the master terminal is present.

11. The system according to claim 10, wherein the remote control is connected to the master terminal through a wired connection or a wireless connection.

12. The system according to claim 11, wherein the remote control is connected to the master terminal through a wired connection, the wired connection comprising a USB connection.

13. The system according to claim 10, wherein the master terminal is connected to the at least one slave terminal through a wireless connection.

14. The system according to claim 13, wherein the wireless connection comprises at least one of a Wi-Fi connection and a Bluetooth connection.

15. The system according to claim 10, wherein the identification information comprises the source identifier, and the controlling, by the at least one processor, the aircraft according to control instructions that are transmitted by the master terminal and/or the at least one slave terminal according to a preset control instruction transmission rule comprises:
detecting, according to the source identifier, whether a control instruction transmitted by the master terminal is present in the control instructions; and
when the control instruction transmitted by the master terminal is present in the control instructions, controlling, by the remote control, the aircraft according to the control instruction transmitted by the master terminal.

16. The system according to claim 10, wherein the identification information comprises the time identifier, and the controlling, by the at least one processor, the aircraft according to control instructions that are transmitted by the master terminal and/or the at least one slave terminal according to a preset control instruction transmission rule comprises:
controlling, by the remote control, the aircraft according to a chronological order in which the control instructions are received, the chronological order in which the control instructions are received being determined by the time identifier.

17. The system according to claim 10, wherein the identification information comprises the source identifier, and the transmitting, by the at least one processor to the aircraft according to the priorities, the control instructions transmitted by the master terminal and/or the at least one slave terminal, to control the aircraft comprises:
determining that the control instructions are transmitted by the at least one slave terminal, when it is detected, according to the source identifier, that a control instruction transmitted by the master terminal is not present in the control instructions;

detecting whether the identification information of the control instructions comprises the time identifier; and transmitting, by the remote control, all of the control instructions sequentially to the aircraft according to a chronological order in which the control instructions are received, to control the aircraft, when the identification information comprises the time identifier, the chronological order in which the control instructions are received being determined by the time identifier.

18. The system according to claim 10, wherein the transmitting, by the at least one processor to the aircraft, the control instruction transmitted by the master terminal and ones of the control instructions transmitted by the at least one slave terminal that implement functions different from the function implemented by the control instruction transmitted by the master terminal comprises:

transmitting the control instruction transmitted by the master terminal to the aircraft;

detecting whether the identification information of the ones of the control instructions transmitted by the at least one slave terminal that implement the functions different from the function implemented by the control instruction transmitted by the master terminal comprises the time identifier; and sequentially transmitting, by the remote control, all of the ones of the control instructions transmitted by the at least one slave terminal that implement the functions different from the function implemented by the control instruction transmitted by the master terminal to the aircraft according to a chronological order in which the control instructions are received, in response to the identification information comprises the time identifier, the chronological order in which the ones of the control instructions transmitted by the at least one slave terminal that implement the functions different from the function implemented by the control instruction transmitted by the master terminal are received being determined by the time identifiers carried by the control instructions.

* * * * *